(12) United States Patent
Duran, Jr. et al.

(10) Patent No.: US 10,237,431 B2
(45) Date of Patent: Mar. 19, 2019

(54) IMAGE FORMING APPARATUS THAT SORTS SHEETS CONTAINED IN SHEET FEED CASSETTE TO PLURALITY OF TRAYS

(71) Applicant: KYOCERA Document Solutions Inc., Osaka (JP)

(72) Inventors: Efren Duran, Jr., Osaka (JP); Shadel Faith Abarquez, Osaka (JP); Divina Agang, Osaka (JP); Neil Dy, Osaka (JP); Gerald Clyde Labadia, Osaka (JP); Aubrey Jean Abanes, Osaka (JP); Jovin Jimenez, Osaka (JP); Joard Saquilon, Osaka (JP); Anthony Sevilla, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/936,987

(22) Filed: Mar. 27, 2018

(65) Prior Publication Data

US 2018/0309887 A1    Oct. 25, 2018

(30) Foreign Application Priority Data

Apr. 20, 2017 (JP) ................................. 2017-083947

(51) Int. Cl.
*H04N 1/00* (2006.01)
*G06K 9/00* (2006.01)

(52) U.S. Cl.
CPC ..... *H04N 1/00641* (2013.01); *G06K 9/00463* (2013.01); *H04N 1/0097* (2013.01); *H04N 1/00633* (2013.01); *H04N 1/00665* (2013.01)

(58) Field of Classification Search
None
See application file for complete search history.

(56) References Cited

U.S. PATENT DOCUMENTS

2016/0122148 A1* 5/2016 Westcott ................ B65H 31/24
358/488
2016/0295043 A1* 10/2016 Matsui ............... H04N 1/00633

FOREIGN PATENT DOCUMENTS

| JP | 2001-358898 A | 12/2001 |
| JP | 2003-195589 A | 7/2003 |
| JP | 2010-089879 A | 4/2010 |

* cited by examiner

*Primary Examiner* — Neil R McLean
*Assistant Examiner* — Pawan Dhingra
(74) *Attorney, Agent, or Firm* — IP Business Solutions, LLC

(57) ABSTRACT

An image forming apparatus includes an operation acceptance section, a storage section, a sheet feed cassette, a plurality of trays, a sorting mechanism, a scanner, a data analyzing section, and a control section. The scanner scans an image of a sheet. The data analyzing section analyzes image data of the sheet scanned by the scanner. When the operation acceptance section accepts a specification of a sorting condition from a user, the control section allows the storage section to store the sorting condition and allows the sorting mechanism to sort the sheet to one of the trays according to the sorting condition using an analysis result of the data analyzing section.

4 Claims, 12 Drawing Sheets

IMAGE FORMING APPARATUS THAT SORTS SHEETS CONTAINED IN SHEET FEED CASSETTE TO PLURALITY OF TRAYS

INCORPORATION BY REFERENCE

This application claims priority to Japanese Patent Application No. 2017-083947 filed on Apr. 20, 2017, the entire contents of which are incorporated by reference herein.

BACKGROUND

The present disclosure relates to image forming apparatuses and particularly relates to a technique for sorting sheets contained in a sheet feed cassette according to a predetermined condition.

There have recently been image forming apparatuses having a function of a sheet sorting device for sorting sheets on which images have been formed (printed). Examples of such a technique for sorting sheets include the following first to third techniques. The first technique is a technique through which the operating time for sorting sheets after a copy work can be reduced. The second technique is a technique in which: any spot on a sheet is detected for each side of the sheet by a sensor; when any spot is detected only on one side of the sheet, printing is performed only on the other side of the sheet where no spot has been detected; when no spot is detected on both sides of the sheet, the sheet is sorted to a reverse side tray; and when any spot is detected on both sides of the sheet, the sheet is sorted to a reject tray. The third technique is a technique in which the size of a blank space of a printed sheet is detected by a blank space detector and the sheet is sorted according to the detected size.

SUMMARY

A technique improved over the aforementioned techniques is proposed as one aspect of the present disclosure.

An image forming apparatus according to one aspect of the present disclosure includes an operation acceptance section, a storage section, a sheet feed cassette, an exit slot, a conveyance path, a plurality of trays, a sorting mechanism, a pick-up roller, a scanner, a data analyzing section, and a control section. The operation acceptance section accepts an operating instruction from a user. The sheet feed cassette is capable of containing sheets to be sorted. The exit slot is a slot through which the sheet is to be discharged. The conveyance path is a path in which the sheet is to be conveyed along a predetermined direction of conveyance from the sheet feed cassette to the exit slot. The plurality of trays are where the sheet discharged through the exit slot is to be loaded. The sorting mechanism sorts the sheet discharged through the exit slot to one of the plurality of trays. The pick-up roller picks up the sheet from the sheet feed cassette to the conveyance path. The scanner scans an image of the sheet. The data analyzing section analyzes image data of the sheet scanned by the scanner. When the operation acceptance section accepts a specification of a predetermined sorting condition from the user, the control section allows the storage section to store the predetermined sorting condition and allows the sorting mechanism to sort the sheet to one of the trays according to the predetermined sorting condition using an analysis result of the data analyzing section.

DETAILED DESCRIPTION

Figure 1:
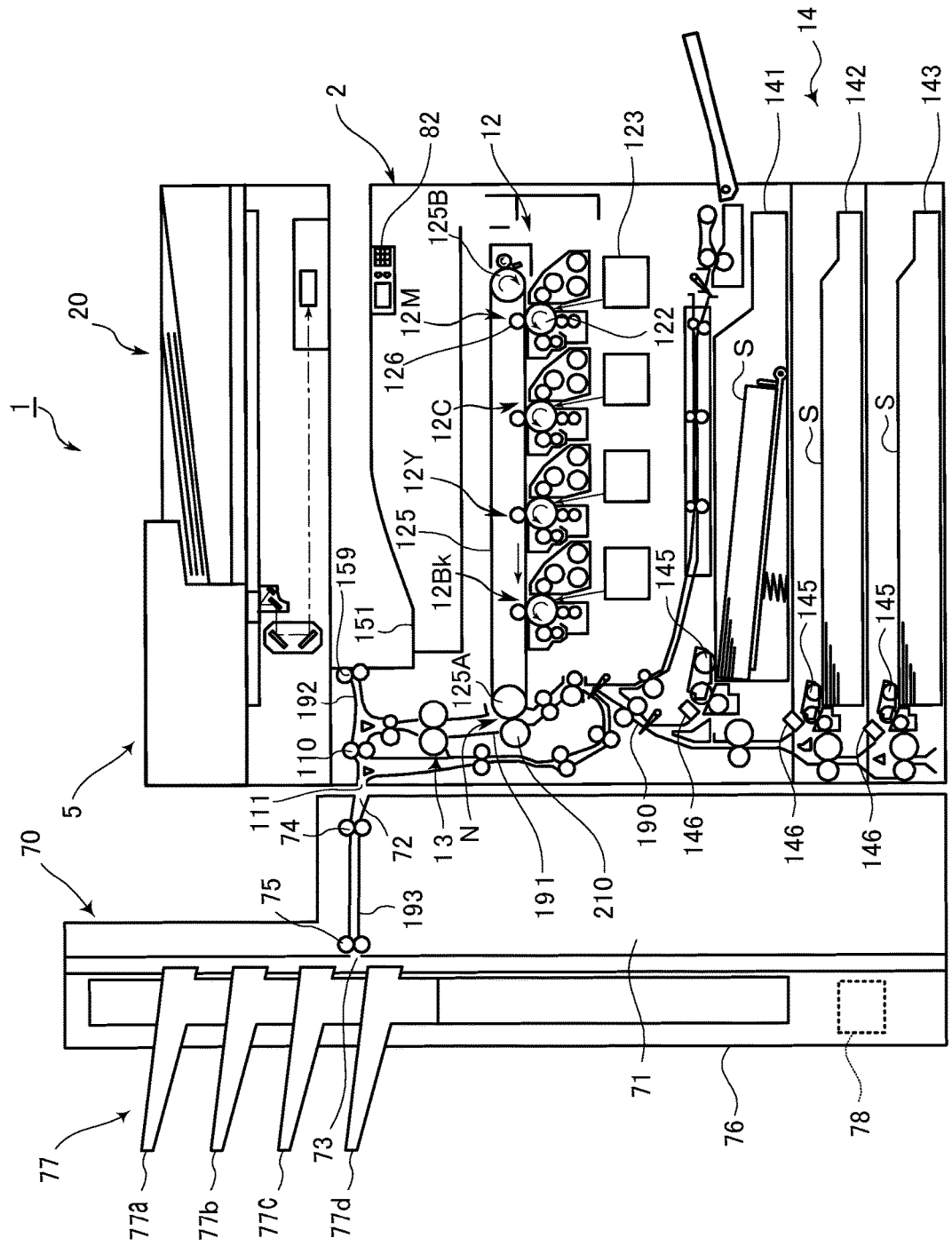
FIG. 1 is a cross-sectional view showing an image forming apparatus according to a first embodiment of the present disclosure.

Hereinafter, a description will be given of embodiments of an image forming apparatus according to the present disclosure with reference to the drawings. FIG. 1 is a cross-sectional view showing an image forming apparatus according to a first embodiment of the present disclosure.

An image forming apparatus 1 according to this embodiment is a multifunction peripheral having multiple functions including, for example, a copy function, a print function, a scan function, a facsimile function, and s sheet sorting function. The image forming apparatus 1 is made up so that an apparatus body 2 includes an operating section 82, an image forming section 12, a fixing section 13, a sheet feed section 14, a document reading section 5, a document feed section 20, a sheet sorting device 70, and so on.

The operating section 82 is operated by a user's operation and accepts, according to this operation, an instruction to perform an image forming operation, an instruction to perform a document reading operation, and other instructions to perform other operations.

In the document reading operation of the image forming apparatus 1, the document reading section 5 optically reads an image or the like of an original document being fed by the document feed section 20 and generates image data from the read image.

In the image forming operation (i.e., a printing operation) of the image forming apparatus 1, based on image data generated by the above document reading operation or other data, a below-described control unit allows the image forming section 12 to perform image formation processing (print processing) on a recording paper sheet (not shown) serving as a recording medium fed from the sheet feed section 14 to form an image on the recording paper sheet.

The document reading section 5 is under the control of the below-described control unit and includes a reader (not shown) including a lighting part, a CCD sensor, and so on. The document reading section 5 reads a document image from an original document by irradiating the original document with light using the lighting part and receiving the reflected light on the CCD sensor and generates image data from the read document image.

The image forming section 12 includes an image forming unit 12M for magenta, an image forming unit 12C for cyan, an image forming unit 12Y for yellow, and an image forming unit 12Bk for black. Each of the image forming units 12M, 12C, 12Y, and 12Bk includes a photosensitive drum 122, a charging device operable to uniformly charge the surface of the photosensitive drum 122, an exposure device 123 operable to expose the surface of the photosensitive drum 122 to a light to form an electrostatic latent image on the surface thereof, a developing device operable to develop the electrostatic latent image on the surface of the photosensitive drum 122 into a toner image using toner, and a primary transfer roller 126.

In performing color printing, the image forming units 12M, 12C, 12Y, and 12Bk uniformly charge the surfaces of their respective photosensitive drums 122, then expose them to light to form respective electrostatic latent images corresponding to images of their color components on the surfaces, develop the electrostatic latent images on the surfaces of the photosensitive drums 122 with the developing devices to form respective toner images of their color components on the photosensitive drums 122, and then allow their respective primary transfer rollers 126 to primarily transfer the toner images to an intermediate transfer belt 125 mounted around a drive roller 125A and a driven roller 125B.

The intermediate transfer belt 125 has an outside surface designed to serve as an image carrying surface on which toner images are to be transferred and can be driven in engagement against the peripheral surfaces of the photosensitive drums 122 by the drive roller 125A. The intermediate transfer belt 125 can travel in an endless path between the drive roller 125A and the driven roller 125B while synchronizing with each photosensitive drum 122.

The toner images of different color components transferred to the intermediate transfer belt 125 are superposed each other on the intermediate transfer belt 125 by controlling their transfer timings, resulting in a multicolor toner image. A secondary transfer roller 210 secondarily transfers the multicolor toner image formed on the surface of the intermediate transfer belt 125, at a nip N between the secondary transfer roller 210 and the intermediate transfer belt 125, to a recording paper sheet conveyed through a conveyance path 190 connecting between the sheet feed section 14 and the secondary transfer roller 210.

Thereafter, the fixing section 13 applies heat and pressure to the recording paper sheet, thus fixing the toner image on the recording paper sheet by heat and pressure. Then, the recording paper sheet is discharged through a first ejection roller pair 159 to a sheet output tray 151. In other words, the recording paper sheet subjected to image formation processing is loaded on the sheet output tray 151. On the other hand, in feeding the recording paper sheet or a below-described sheet S toward the sheet sorting device 70, the first ejection roller pair 159 moves back the recording paper sheet or the sheet S while nipping it, thus carrying the recording paper sheet or the sheet S through a second ejection roller pair 110 into the sheet sorting device 70.

The sheet feed section 14 includes a plurality of, for example, three sheet feed cassettes, i.e., first, second, and third sheet feed cassettes 141, 142, and 143. These first, second, and third sheet feed cassettes 141, 142, 143 are removably mounted to the apparatus body 2. The first, second, and third sheet feed cassettes 141, 142, 143 are designed so that the user can set thereinto above-described recording paper sheets to be subjected to image formation processing or printed sheets S to be sorted by the above-described sheet sorting function using the sheet sorting device 70 or the like. The description hereinafter will be given taking as an example the case where the printed sheets S are set in all of the first, second, and third sheet feed cassettes 141, 142, 143 by the user.

Pick-up rollers 145 are provided, one above each of the first, second, and third sheet feed cassettes 141, 142, 143. Each pick-up roller 145 picks up, under the control of a below-described control section, a sheet S from an associated one of the first, second, and third sheet feed cassettes 141, 142, 143 to the conveyance path 190. Specifically, in performing sorting processing for sheets S contained in the first sheet feed cassette 141 according to a user's instruction toward a below-described operation acceptance section, the pick-up roller 145 picks up an uppermost sheet S in the first sheet feed cassette 141 and feeds it out to the conveyance path 190.

Furthermore, scanners 146 are provided, one downstream of each of the pick-up rollers 145 in the direction of conveyance of the sheets S. Each scanner 146 is provided with, for example, a contact image sensor (CIS) or a CCD sensor and reads the image of a sheet S being conveyed in the conveyance path 190. Then, the scanner 146 outputs the read image data of the sheet S to a below-described data analyzing section.

The sheet sorting device 70 includes: a main unit 71; a receiving slot 72 formed in the main unit 71 to face an apparatus body exit slot 111 in the apparatus body 2 and capable of receiving the above-described recording paper sheet or sheet S carried out through the apparatus body exit slot 111 by the second ejection roller pair 110; an exit slot 73 through which the recording paper sheet or sheet S carried in the main unit 71 through the receiving slot 72 is to be discharged; and a plurality of, for example, four trays (first, second, third, and fourth trays 77a, 77b, 77c, 77d which are hereinafter referred collectively to as trays 77) on one of which the recording paper sheet or sheet S discharged through the exit slot 73 is to be loaded. The main unit 71 of the sheet sorting device 70 is internally provided with a conveyance roller pair 74 near the receiving slot 72 and a third ejection roller pair 75 near the exit slot 73. In the main unit 71, the recording paper sheet or sheet S is conveyed in a conveyance path 193 connecting between the receiving slot 72 and the exit slot 73 by the conveyance roller pair 74 and the third ejection roller pair 75.

The sheet sorting device 70 further includes a sorting mechanism capable of sorting the sheet S discharged through the exit slot 73 to one of the plurality of trays 77. Specifically, the sheet sorting device 70 includes: a support member 76 to which the plurality of trays 77 are mounted at different positions with a predetermined distance between them in the vertical direction and which supports the plurality of trays 77 to allow their vertical movement; and a motor 78 that vertically moves the plurality of trays 77. The sheet sorting device 70 sorts, under the control of the below-described control section, the recording paper sheet or sheet S to one of the trays 77.

In the image forming apparatus 1, the sheets S are conveyed in the conveyance paths provided in the interiors of the apparatus body 2 and the main unit 71 along a predetermined direction of conveyance from the first, second, and third sheet feed cassettes 141, 142, 143 to the exit slot 73. Specifically, each sheet S is carried from the first, second or third sheet feed cassette 141, 142, 143 via the conveyance path 190 connecting between the sheet feed section 14 and the secondary transfer roller 210, a conveyance path 191 connecting between the secondary transfer roller 210 and the first ejection roller pair 159, a conveyance path 192 connecting between the first ejection roller pair 159 and the apparatus body exit slot 111, and the conveyance path 193 connecting between the receiving slot 72 and the exit slot 73 to one of the trays 77. These conveyance paths 190 to 193 are an example of the conveyance path defined in What is claimed is. On the other hand, in the case where the recording paper sheet to be subjected to image formation processing by the image forming section 12 is sorted by the sheet sorting device 70, the recording paper sheet is conveyed via the conveyance path 190, the intermediate transfer belt 125 serving as a conveyance path, the conveyance path 191, the conveyance path 192, and the conveyance path 193 in this order and then carried to one of the trays 77.

Figure 2:
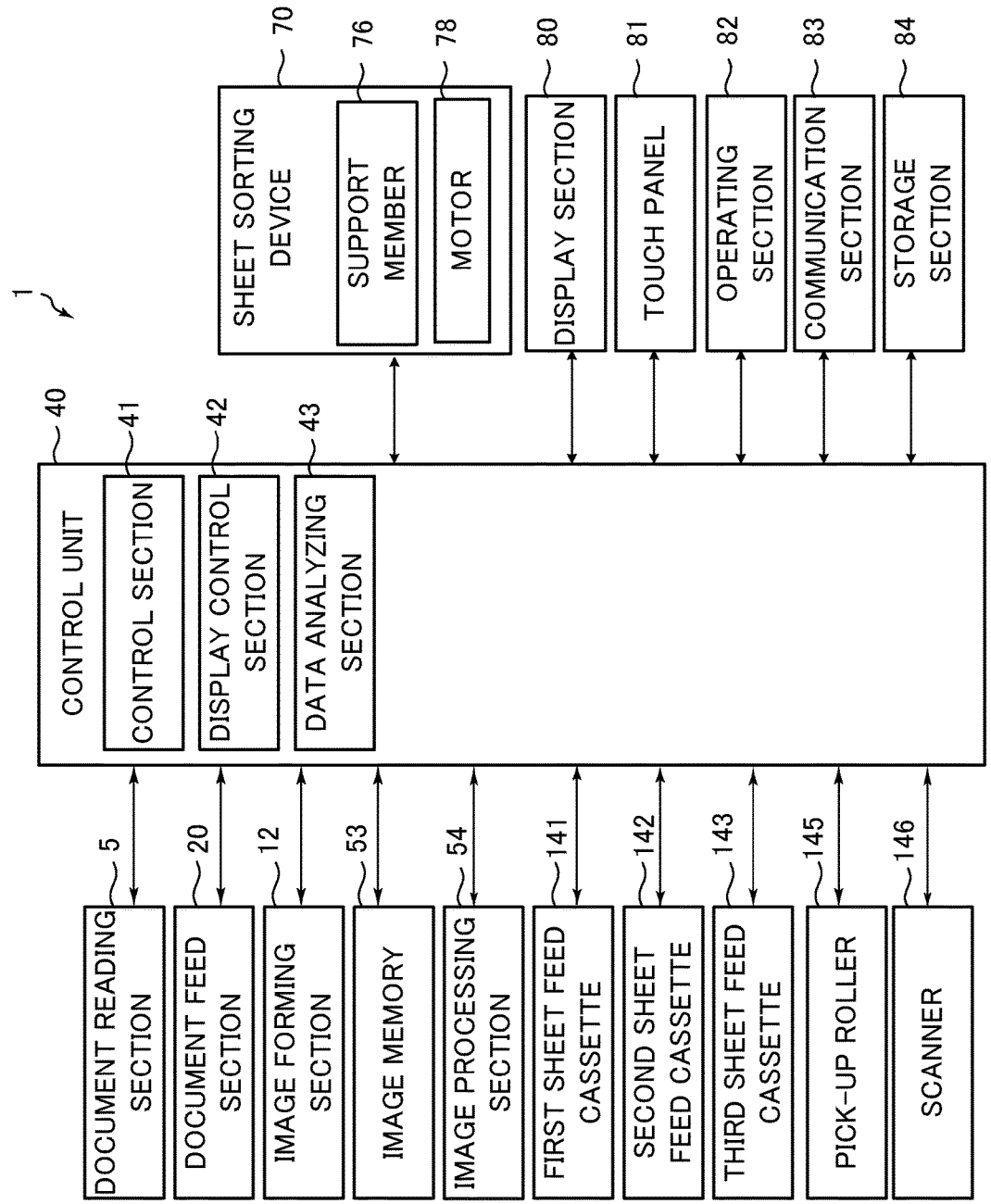
FIG. 2 is a functional block diagram showing the configuration of essential components of the image forming apparatus.

FIG. 2 is a functional block diagram showing the configuration of essential components of the image forming apparatus 1. The image forming apparatus 1 has a configuration in which a control unit 40, the document reading section 5, the document feed section 20, the image forming section 12, an image memory 53, an image processing section 54, the first, second, and third sheet feed cassettes 141, 142, 143, the pick-up rollers 145, the scanners 146, the sheet sorting device 70, a display section 80, a touch panel 81, an operating section 82, a communication section 83, and a storage section 84 are connected to each other via a bus. Since the document reading section 5, the document feed section 20, the image forming section 12, the first, second, and third sheet feed cassettes 141, 142, 143, the pick-up rollers 145, the scanners 146, the sheet sorting device 70, and the operating section 82 have already been described, a description thereof will not be repeated here.

The control unit 40 is composed of a CPU, a RAM, a ROM, a dedicated hardware circuit, and so on and governs the overall operation control of the image forming apparatus 1.

The image memory 53 has a storage area where image data of the document image acquired by reading by the document reading section 5 is temporarily stored and data for print processing to be printed by the image forming section 12 is temporarily saved.

The image processing section 54 reads image data read by the document reading section 5 from the image memory 53 and subjects it to image processing. For example, in order that the image data read by the document reading section 5 will be improved in quality after being formed into an image by the image forming section 12, the image processing section 54 performs predetermined image processing, such as shading correction.

The display section 80 is composed of a liquid crystal display, an organic EL display or the like.

The touch panel 81 is disposed in the front of the display section 80. The touch panel 81 is a touch panel of, for example, a so-called resistive film system or a capacitance system and detects a user's touch on the touch panel 81 together with a point of touch. When detecting the user's touch, the touch panel 81 outputs a detection signal indicating a coordinate point of the point of touch to the control section 41 and so on. The touch panel 81 and the operating section 82 are examples of the operation acceptance section defined in What is claimed is.

The communication section 83 includes a communication module, such as a LAN board, and performs, under the control of the control section 41 or the like, various data communications with information processing apparatuses, servers, and so on via a network connected to the communication section 83.

The storage section 84 is a large storage device, such as an HDD (hard disk drive) or an SSD (solid state drive). The storage section 84 stores, under the control of the control section 41, any predetermined sorting condition for use in sheet sorting processing to be performed on the sheet sorting device 70 according to user's operations of the operation acceptance section.

The control unit 40 is composed of a CPU, a ROM, a RAM, and so on and governs the overall operation of the image forming apparatus 1. The control unit 40 includes a control section 41, a display control section 42, and a data analyzing section 43.

The control unit 40 is composed of a processor, a RAM (random access memory), a ROM (read only memory), and so on. The processor is, for example, a CPU (central processing unit), an MPU or an ASIC. When a sheet sorting execution program stored on the storage section 84 or the like is executed by the above processor, the control unit 40 functions as the control section 41, the display control section 42, and the data analyzing section 43. Alternatively, each of the control section 41, the display control section 42, and the data analyzing section 43 may not be implemented by the operation of the control unit 40 in accordance with the sheet sorting execution program but may be constituted by a hardware circuit. Hereinafter, the same applies to the other embodiment unless otherwise stated.

The control section 41 governs the overall operation of the image forming apparatus 1 and is connected to the document reading section 5, the document feed section 20, the image forming section 12, the image memory 53, the image processing section 54, the first, second, and third sheet feed cassettes 141, 142, 143, the pick-up rollers 145, the scanners 146, the sheet sorting device 70, the display section 80, the touch panel 81, the operating section 82, the communication section 83, the storage section 84, and so on to control the operations of these components.

The display control section 42 has the function of controlling a display operation of the display section 80. Furthermore, the display control section 42 allows the display section 80 to provide a display prompting the user to specify any predetermined sorting condition.

When the operation acceptance section accepts a specification of the one or more predetermined sorting conditions from the user, the control section 41 allows the storage section 84 to store the predetermined sorting conditions specified by the user.

The data analyzing section 43 has the function of performing OCR processing and the function of detecting the colors of pixels (picture elements) and analyzes image data of a sheet S read by the scanner 146. For example, the data analyzing section 43 determines whether the sheet S contains a predetermined keyword using the result of reading by OCR processing and outputs the determination as an analysis result to the control section 41. Furthermore, the data analyzing section 43 detects the colors of pixels of the sheet S by a known technique, determines the (ground) color of the sheet S, and outputs the determination as an analysis result to the control section 41. Since, as described above, the data analyzing section 43 has the function of performing OCR processing, the sorting conditions for a sheet S can include a keyword printed on the sheet S.

The control section 41 controls, using the analysis result of the data analyzing section 43, the operation of the sorting mechanism according to the one or more predetermined sorting conditions stored in the storage section 84 to sort the sheet S to one of the trays 77. For example, the control section 41 controls the operation of the motor 78 to change the positions of the first to fourth trays 77a to 77d relative to the exit slot 73 in the sorting mechanism, thus sorting the sheet S to one of the trays 77.

For example, the control section 41 uses at least one of a predetermined keyword described on the sheet S and a predetermined color of the sheet S as the predetermined sorting condition. Thus, in this embodiment, the sorting processing for the sheet S can be implemented using at least one of the keyword printed on the sheet S and the ground color of the sheet S as a sorting condition.

The control section 41 controls each of the operations of the plurality of pick-up rollers 146 to allow the pickup of the sheets S to the conveyance path in a predetermined order from any one of the first, second, and third sheet feed cassettes 141, 142, 143 and on a sheet-feed-cassette-by-sheet-feed-cassette basis. Specifically, for example, when the first, second, and third sheet feed cassettes 141, 142, 143 are specified in this order by the user, the control section 41 controls each of the operations of the plurality of pick-up rollers 145 to first perform sorting processing for all the sheets S contained in the first sheet feed cassette 141, then perform sorting processing for all the sheets S contained in the second sheet feed cassette 142, and finally perform sorting processing for all the sheets S contained in the third sheet feed cassette 143. Since, as just described, the control section 41 allows for sorting processing for sheets S on a sheet-feed-cassette-by-sheet-feed-cassette basis even when sheets S are contained in all the first, second, and third sheet feed cassettes 141, 142, 143, the sorting processing for sheets S can be smoothly performed without being complicated.

Figure 3:
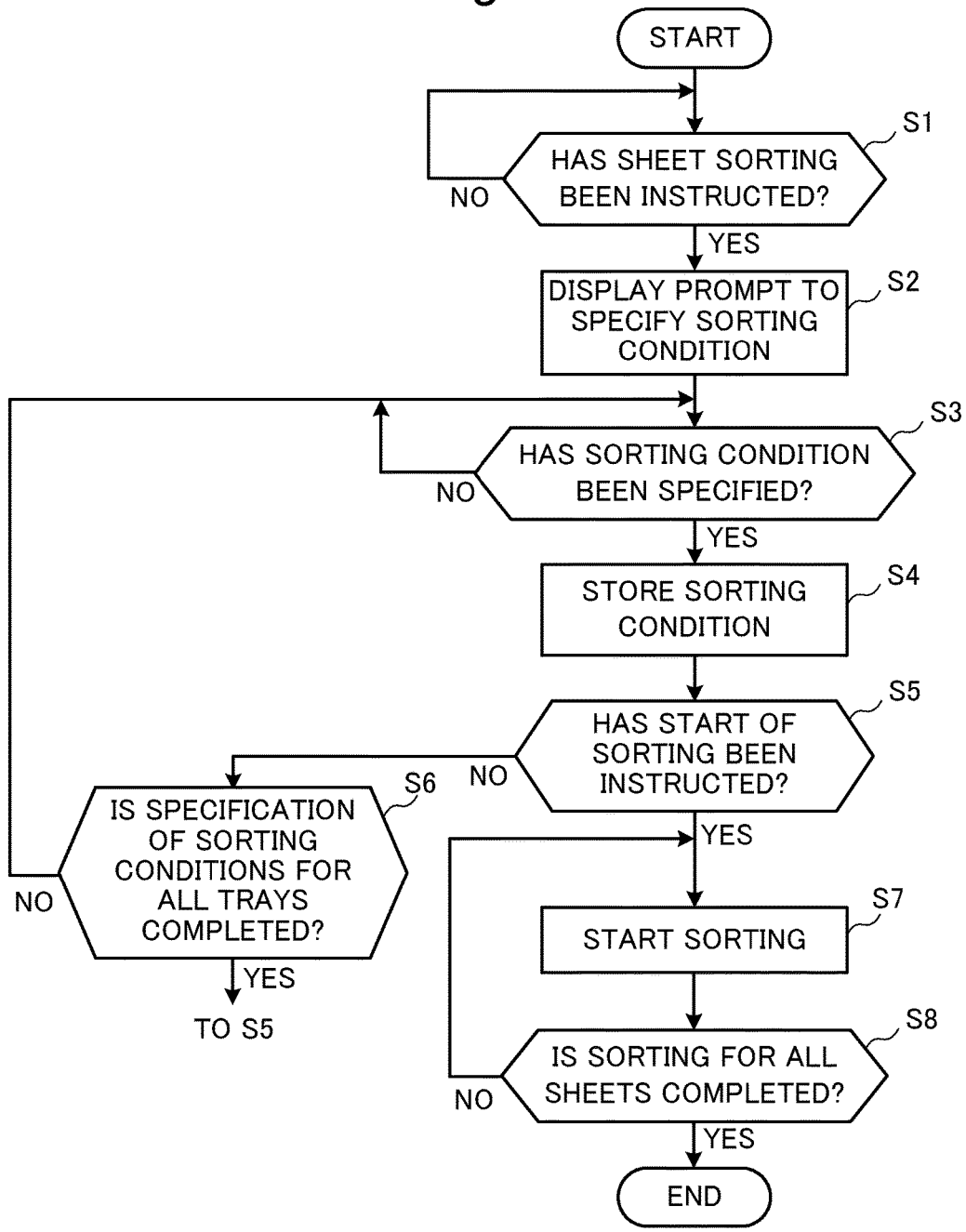
FIG. 3 is a flowchart showing a flow of processing on the image forming apparatus.
Figure 4:
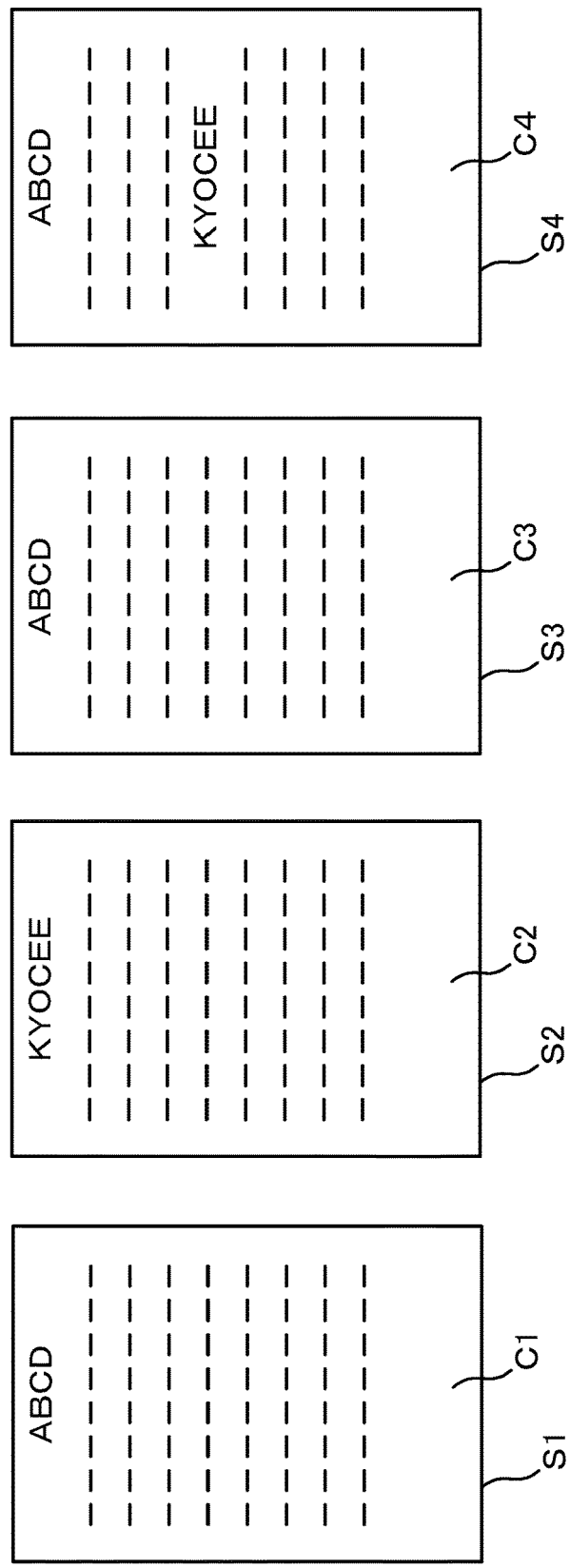
FIG. 4 is a view showing specific examples of sheets to be sorted on the image forming apparatus.

Next, a detailed description will be given of the operation of the image forming apparatus 1 according to this embodiment with reference to FIG. 3. FIG. 3 is a flowchart showing a flow of processing on the image forming apparatus 1. The following description will be given mainly of sorting processing for sheets S. Furthermore, the following description will be given taking as an example the case where four types of sheets S1, S2, S3, and S4 shown in FIG. 4 are contained as the sheets S in the first, second, and third sheet feed cassettes 141, 142, 143. For example, suppose that, as shown in FIG. 4, the sheet S1 has letters "ABCD" printed on a page C1 with a white ground color and the sheet S2 has letters "KYOCEE" printed on a page C2 with a white ground color. Furthermore, suppose that the sheet S3 has letters "ABCD" printed on a page C3 with a red ground color and the sheet S4 has letters "ABCD" and letters "KYOCEE" printed on a page C4 with a blue ground color.

Figure 5:
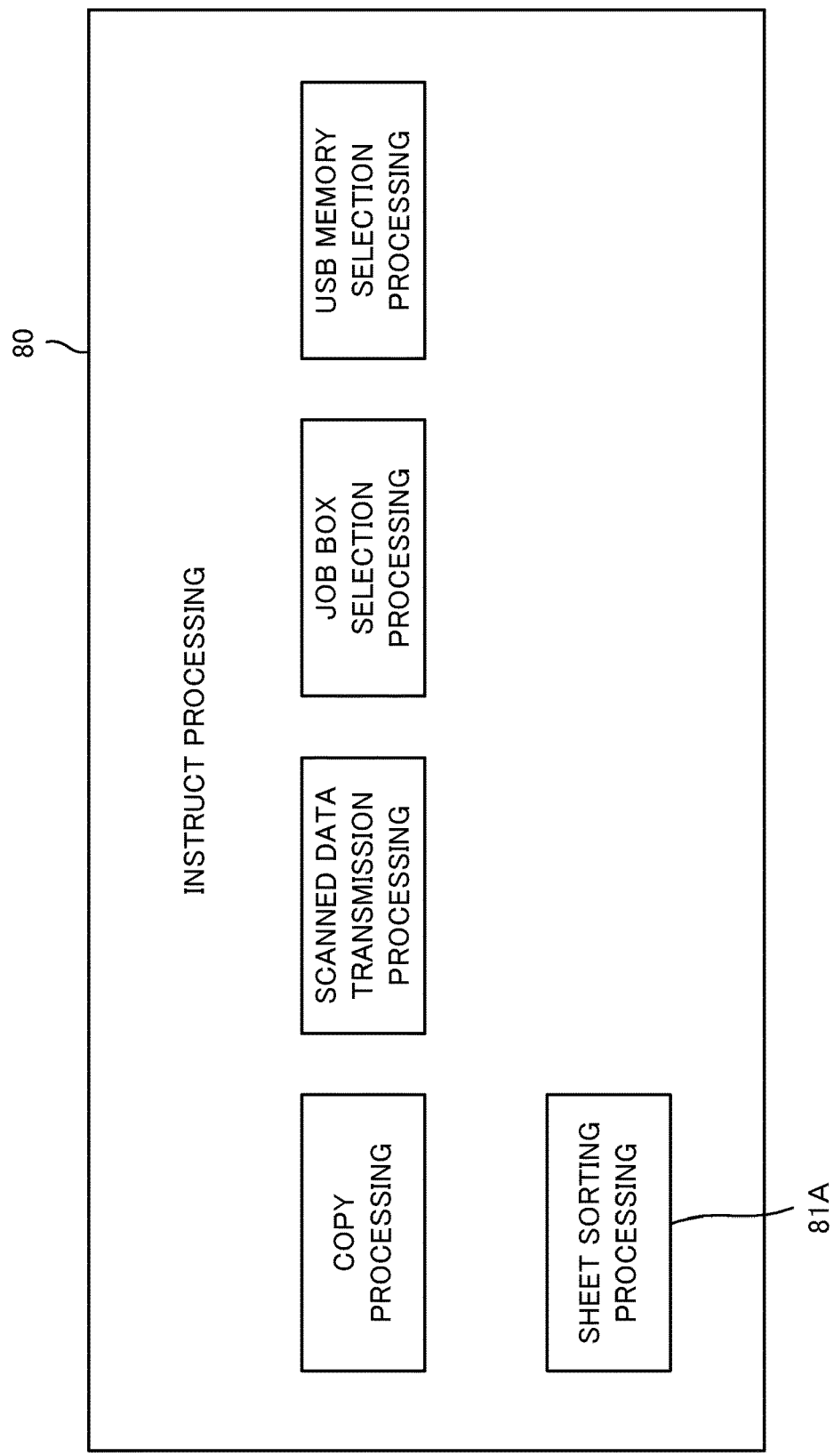
FIG. 5 is a view showing an example of a display screen displayed on a display section of the image forming apparatus.

The control section 41 determines whether the operation acceptance section has accepted a request instructing to execute sheet sorting processing from the user (S1). For example, when, as shown in FIG. 5, the display control section 42 allows the display section 80 to provide a display prompting the user to instruct any processing operation while the image forming apparatus 1 is on standby where no operation is performed, the control section 41 detects whether a Sheet Sorting Processing key 81A has been specified by the user, thus determining whether a request instructing to execute sheet sorting processing has been made by the user. When the touch panel 81 does not detect that the Sheet Sorting Processing key 81A has been specified (NO in S1), the control section 41 does not allow the process to proceed to S2 and allows the image forming apparatus 1 to stand by.

Figure 6:
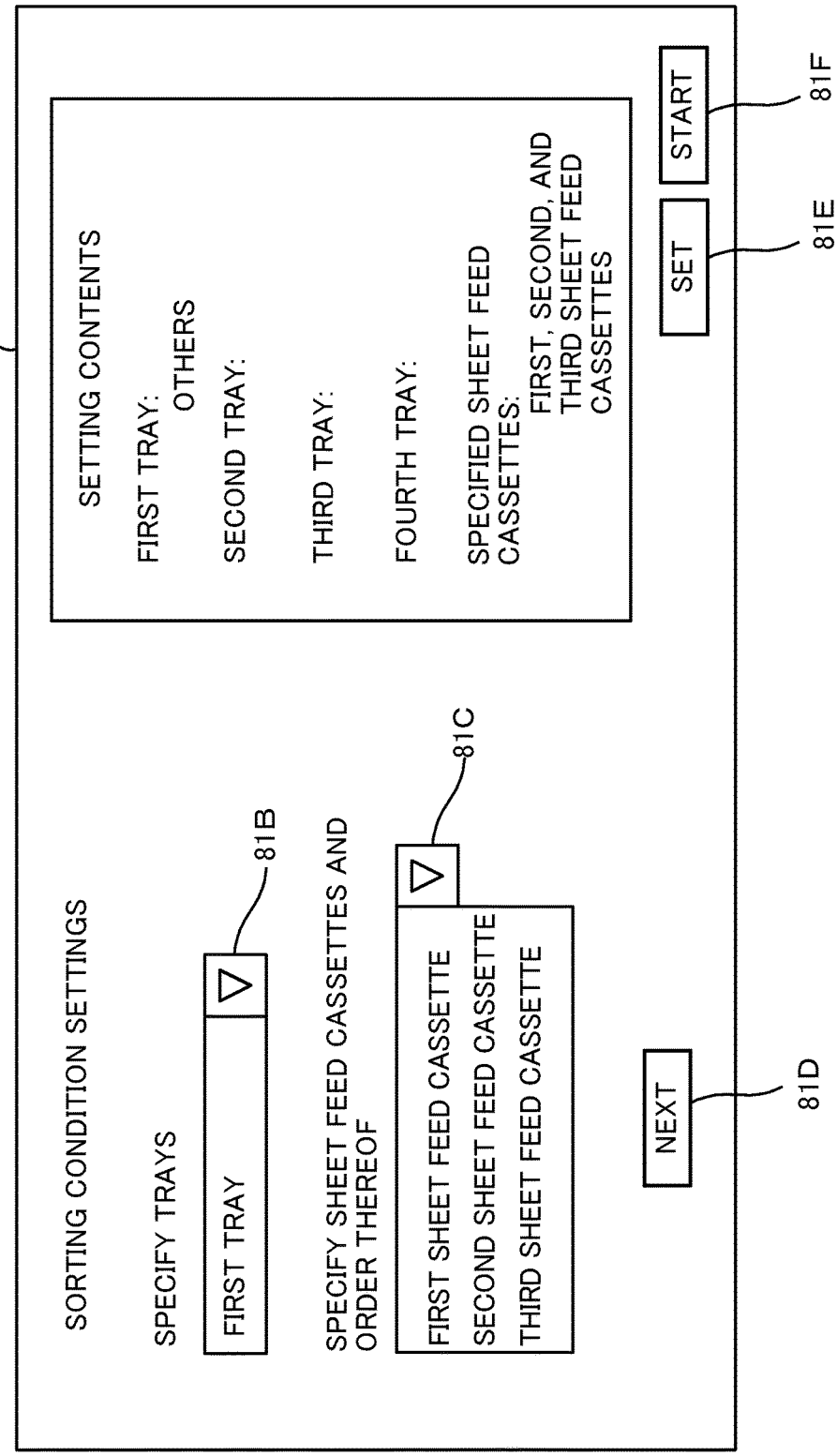
FIG. 6 is a view showing an example of another display screen displayed on the display section of the image forming apparatus.

On the other hand, when detecting that the Sheet Sorting Processing key 81A has been specified by the user and that the key specification has been accepted by the touch panel 81 (YES in S1), the control section 41 determines that the execution of sheet sorting processing has been requested. Then, the display control section 42 allows the display section 80 to display, for example, as shown in FIG. 6, a display prompting the user to specify any sorting condition (S2). Specifically, as shown in the display screen in FIG. 6, the display control section 42 allows the display section 80 to provide a display prompting to specify a tray to which sheets S are to be sorted, specify one or more sheet feed cassettes in which the sheets S are contained (i.e., sheet feed cassettes to be subjected to sheet sorting processing), and specify the order of the sheet feed cassettes for the sheet sorting processing.

Then, the control section 41 determines whether the operation acceptance section has accepted a specification of any sorting condition from the user (S3). For example, when the touch panel 81 does not detect that, in the display screen shown in FIG. 6, a specification of a tray to which sheets S are to be sorted, a specification of one or more sheet feed cassettes to be subjected to sorting processing, and a specification of the order of the sheet feed cassettes for the sorting processing have been done (NO in S3), the control section 41 does not allow the process to proceed to S4 and allows the image forming apparatus 1 to stand by.

On the other hand, when the touch panel 81 detects that a specification of a tray to which sheets S are to be sorted, a specification of one or more sheet feed cassettes to be subjected to sorting processing, and a specification of the order of the sheet feed cassettes for the sorting processing have been done by the user and that a Set key 81E has also been specified (YES in S3), the control section 41 determines that the sorting conditions have been specified. Then, the control section 41 allows the storage section 84 to store the specified sorting conditions (S4).

For example, when detecting that a pull-down menu 81B has been pressed by the user and that the touch panel 81 has accepted that the first tray 77a has been specified, the control section 41 determines that the first tray 77a has been specified as a tray to which sheets S are to be sorted. Furthermore, when detecting that a pull-down menu 81C has been pressed by the user and that the pressing has been accepted by the touch panel 81, the control section 41 determines that any sheet feed cassette to be subjected to sorting processing and the order of sheet feed cassettes for the sorting processing will be specified. Then, the display control section 42 allows the display section 80 to display a display field (not shown) for use in user's specification of any of the first sheet feed cassette 141, the second sheet feed cassette 142, and the third sheet feed cassette 143. Then, for example, when detecting that the touch panel 81 has accepted that the specification in the display field has been done in the order of the first sheet feed cassette 141, the second sheet feed cassette 142, and the third sheet feed cassette 143 by the user, the control section 41 determines that the first sheet feed cassette 141, the second sheet feed cassette 142, and the third sheet feed cassette 143 have been specified as sheet feed cassettes to be subjected to sorting processing and as the order of sheet feed cassettes for the sorting processing.

When detecting that a Next key 81D has been specified by the user and that the key specification has been accepted by the touch panel 81, the control section 41 determines that any sorting condition for the first tray 77a will be specified. Then, the display control section 42 allows the display section 80 to provide a display prompting the user to specify any sorting condition as will be described hereinafter. On the other hand, when detecting that the Next key 81D is not specified by the user, that the Set key 81E has been specified, and that the key specification has been accepted by the touch panel 81, the control section 41 determines that neither keyword nor color of sheets has been specified as a sorting condition for the first tray 77a. Then, the control section 41 allows the storage section 84 to store the specified first, second, and third sheet feed cassettes 141, 142, 143 as sheet feed cassettes to be subjected to sorting processing and as the order for the sorting processing and allows the storage section 84 to store, as a sorting condition for the first tray 77a, a sorting condition that neither keyword nor color of sheets is specified, for example, a sorting condition of "OTHERS". Then, the display control section 42 allows the display section 80 to display setting contents of the sorting conditions that the control section 41 has allowed the storage section 84 to store. Specifically, as shown in FIG. 6, the display control section 42 allows the display section 80 to display "OTHERS" as the sorting condition for the first tray 77a and display "FIRST, SECOND, AND THIRD SHEET FEED CASSETTES" as the specified sheet feed cassettes.

Then, the control section 41 determines whether the operation acceptance section has accepted a request instructing to start the execution of the sheet sorting processing from the user (S5). For example, the control section 41 detects whether a Start key 81F in the display screen shown in FIG. 6 has been specified, thus determining whether a request instructing to start the execution of the sheet sorting processing has been made. When the touch panel 81 does not detect that the Start key 81F has been specified (NO in S5), the control section 41 determines whether the specification of the sorting conditions for all the trays 77 is completed (S6). When determining that the specification of the sorting conditions for all the trays 77 is not completed (NO in S6), the control section 41 allows the process to go back to S3 described above and executes the processing again.

Figure 7:
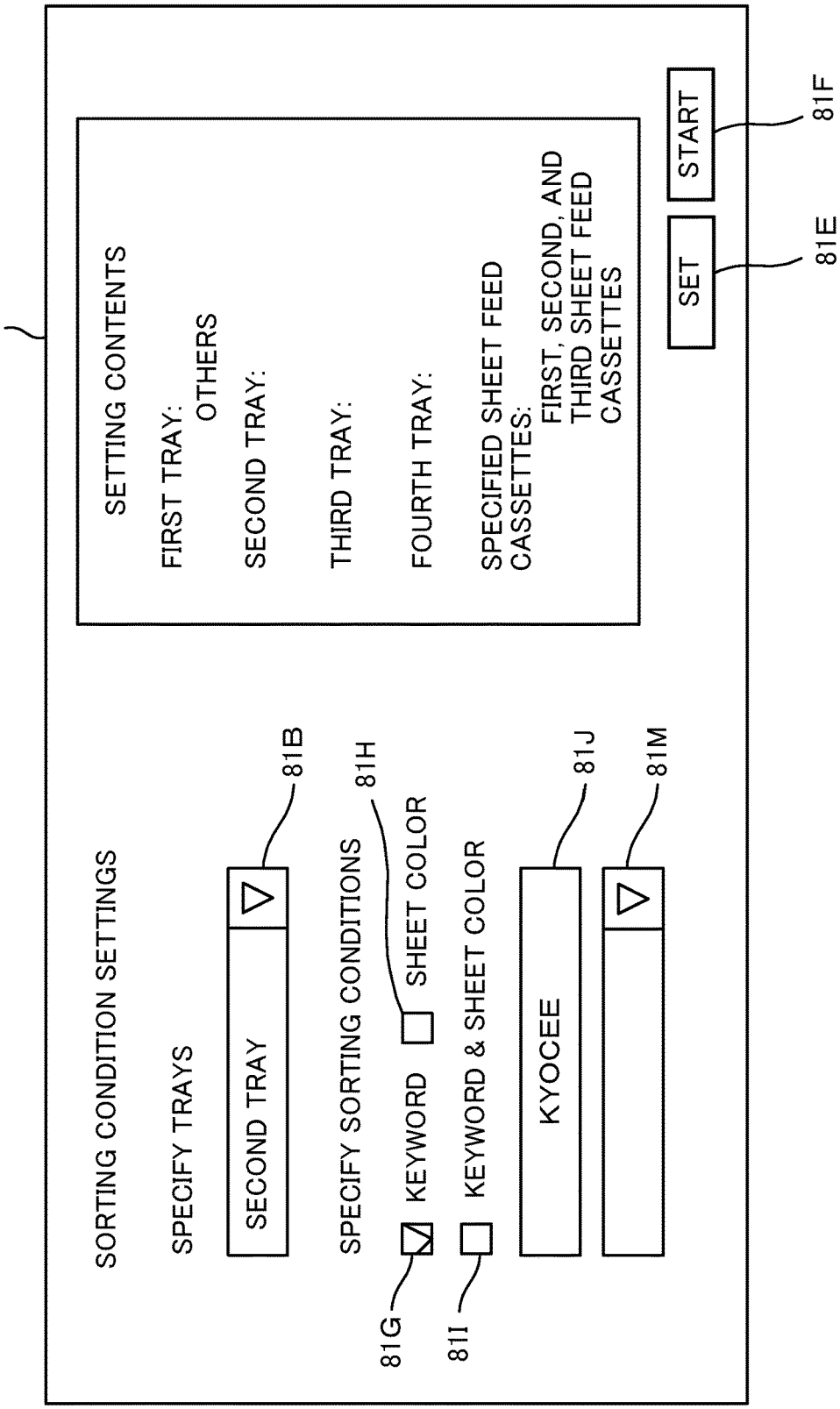
FIG. 7 is a view showing an example of still another display screen displayed on the display section of the image forming apparatus.

Then, as shown in FIG. 7, the display control section 42 allows the display section 80 to provide a display prompting the user to specify a tray to which sheets S are to be sorted and any sorting condition. For example, as shown in the display screen in FIG. 7, in order that the user can specify a keyword as a sorting condition, the display control section 42 allows the display section 80 to display a check box 81G in which an image indicating that it has been selected by the user can be displayed. Furthermore, as shown in the display screen in FIG. 7, in order that the user can specify the color of sheets S as a sorting condition, the display control section 42 allows the display section 80 to display a check box 81H in which an image indicating that it has been selected by the user can be displayed. Moreover, as shown in the display screen in FIG. 7, in order that the user can specify a keyword and the color of sheets S as sorting conditions, the display control section 42 allows the display section 80 to display a check box 81I in which an image indicating that it has been selected by the user can be displayed. As shown in the display screen in FIG. 7, the display control section 42 also allows the display section 80 to display an input field 81J to which a keyword can be input by the user. As shown in the display screen in FIG. 7, the display control section 42 also allows the display section 80 to display a pull-down menu 81M in which the color of sheets S can be specified by the user.

Alternatively, when detecting that in the display screen shown in FIG. 6 the Next key 81D has been specified by the user and that the key specification has been accepted by the touch panel 81, the control section 41 determines that any sorting condition for the first tray 77a will be specified. Then, the display control section 42 allows the display section 80 to display the check boxes 81G, 81H, 81I, the input field 81J, and the pull-down menu 81M, all of which are shown in FIG. 7, thus prompting the user to specify any sorting condition for the first tray 77a.

Figure 8:
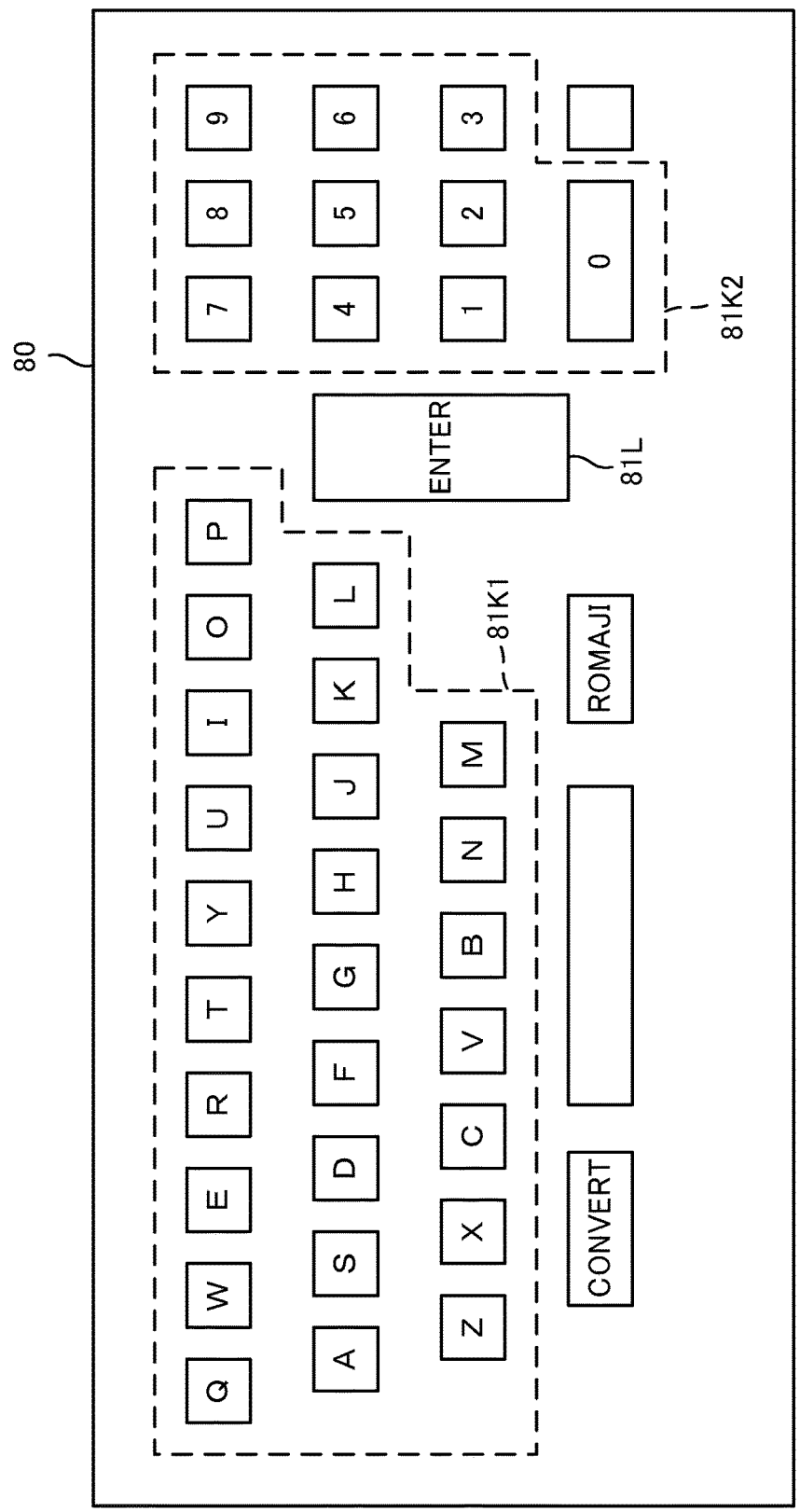
FIG. 8 is a view showing an example of still another display screen displayed on the display section of the image forming apparatus.

When detecting that the pull-down menu 81B has been pressed by the user and that the touch panel 81 has accepted that the second tray 77b has been further specified, the control section 41 determines that the second tray 77b has been specified as a tray to which sheets S are to be sorted. Furthermore, when detecting that in the display screen shown in FIG. 7, for example, the check box 81G has been specified, that the box specification has been accepted by the touch panel 81, that the input field 81J has also been specified, and that the field specification has been accepted by the touch panel 81 (YES in S3), the control section 41 determines that a keyword will be specified as a sorting condition. Then, the display control section 42 allows the display section 80 to display, for example, as shown in FIG. 8, alphabet keys 81K1, numeric keys 81K2, and an Enter key 81L so that the user can specify a keyword.

Subsequently, for example, when detecting that in the display screen in FIG. 8 alphabet keys 81K1 corresponding to "KYOCEE" have been input, that the input has been accepted by the touch panel 81, that the Enter key 81L has been specified, and that the key specification has been accepted by the touch panel 81, the control section 41 determines that letters "KYOCEE" have been input as a keyword. Then, as shown in FIG. 7, the display control section 42 allows the display section 80 to display the input letters "KYOCEE" in the input field 81J. In addition, the control section 41 allows the storage section 84 to store the specified sorting conditions, i.e., the second tray 77b serving as a tray to which sheets S are to be sorted and the letters "KYOCEE" serving as a keyword for the second tray 77b (S4).

Besides the above description, a plurality of keywords may be used as a sorting condition. For example, when detecting that in the display screen in FIG. 8 the alphabet keys 81K1 corresponding to "KYOCEE" have been input, that a predetermined delimiter, such as "," (not shown), has been then input, that numeric keys 81K2 of "123" have been then input, that these inputs have been accepted by the touch panel 81, that the Enter key 81L has been then specified, and that the key specification has been accepted by the touch panel 81, the control section 41 determines that "KYOCEE" and "123" have been input as keywords. Furthermore, with the use of different characters as delimiters, the control section 41 can determine whether the plurality of keywords are under the AND condition or under the OR condition. Specifically, for example, when letters "KYOCEE &123" are input as keywords, the control section 41 executes sorting processing for sorting sheets S containing both the keywords "KYOCEE" and "123". On the other hand, for example, when letters "KYOCEE,123" are input as keywords, the control section 41 executes sorting processing for sorting sheets S containing at least one of the keywords "KYOCEE" and "123".

Then, the control section 41 determines whether the operation acceptance section has accepted a request instructing to start the execution of the sheet sorting processing from the user (S5). For example, the control section 41 detects whether the Start key 81F in the display screen shown in FIG. 7 has been specified, thus determining whether a request instructing to start the execution of the sheet sorting processing has been made. When the touch panel 81 does not detect that the Start key 81F has been specified (NO in S5), the control section 41 determines whether the specification of the sorting conditions for all the trays 77 is completed (S6). When determining that the specification of the sorting conditions for all the trays 77 is not completed (NO in S6), the control section 41 allows the process to go back to S3 described above and executes the processing again.

Figure 9:
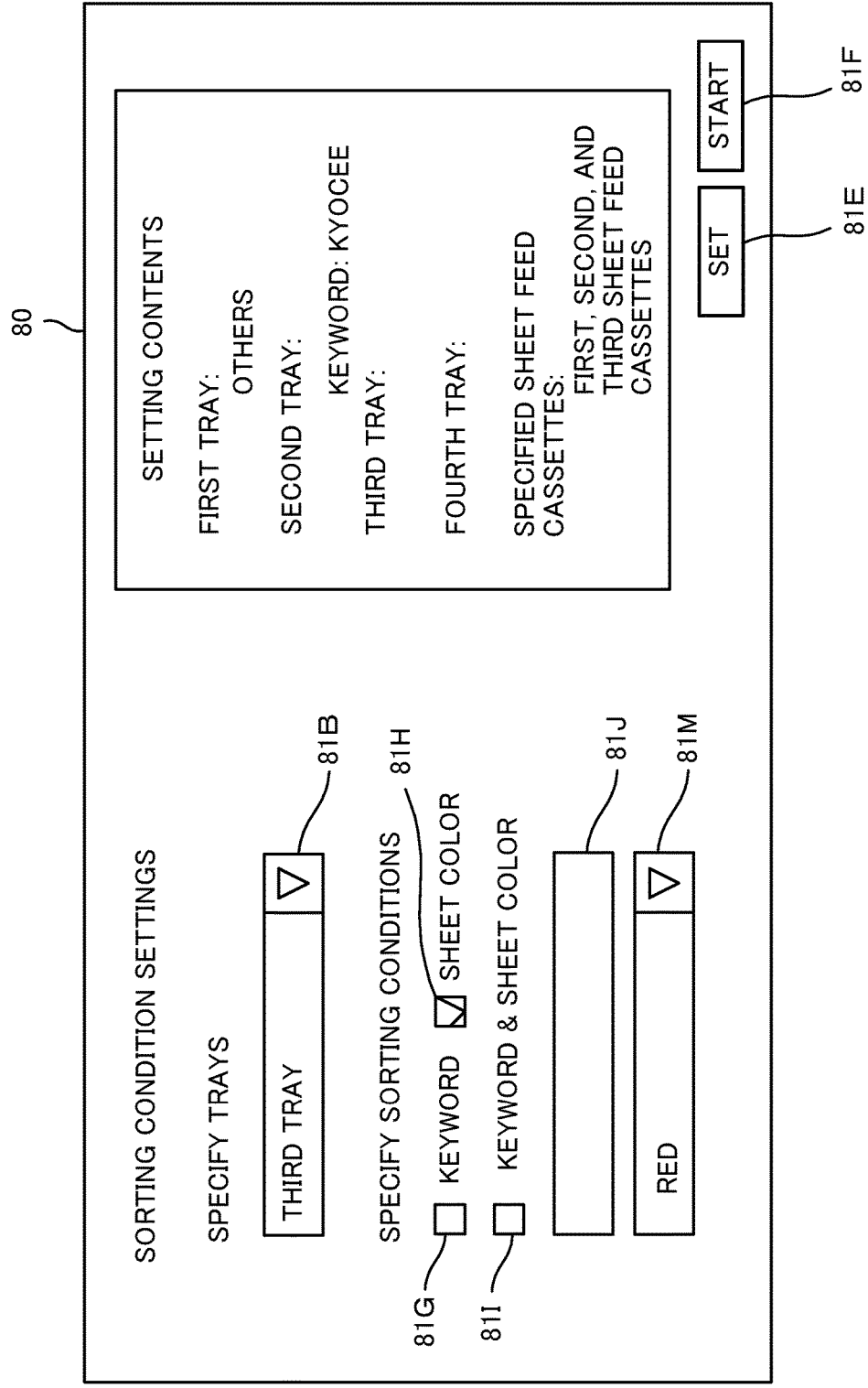
FIG. 9 is a view showing an example of still another display screen displayed on the display section of the image forming apparatus.

Then, as shown in FIG. 9, the display control section 42 allows the display section 80 to provide a display prompting the user to specify a tray to which sheets S are to be sorted and any sorting condition. Furthermore, as shown in FIG. 9, the display control section 42 allows the display section 80 to display, as a sorting condition for the second tray 77b, the sorting condition stored for the second tray 77b in the storage section 84 in S4 described above, i.e., "KEYWORD: KYOCEE".

When detecting that the pull-down menu 81B has been pressed by the user and that the touch panel 81 has accepted that the third tray 77c has been further specified, the control section 41 determines that the third tray 77c has been specified as a tray to which sheets S are to be sorted. Furthermore, when detecting that in the display screen shown in FIG. 9, for example, the check box 81H has been specified, that the box specification has been accepted by the touch panel 81, that the pull-down menu 81M has also been pressed, and that the touch panel 81 has accepted that, for example, "RED" has been further specified as the color of sheets S (YES in S3), the control section 41 determines that the color of sheets S has been specified as a sorting condition. In addition, the control section 41 allows the storage section 84 to store the specified sorting conditions, i.e., the third tray 77c serving as a tray to which sheets S are to be sorted and "RED" serving as the color of sheets S for the third tray 77c (S4).

Then, the control section 41 determines whether the operation acceptance section has accepted a request instructing to start the execution of the sheet sorting processing from the user (S5). For example, the control section 41 detects whether the Start key 81F in the display screen shown in FIG. 9 has been specified, thus determining whether a request instructing to start the execution of the sheet sorting processing has been made. When the touch panel 81 does not detect that the Start key 81F has been specified (NO in S5), the control section 41 determines whether the specification of the sorting conditions for all the trays 77 is completed (S6). When determining that the specification of the sorting conditions for all the trays 77 is not completed (NO in S6), the control section 41 allows the process to go back to S3 described above and executes the processing again.

Figure 10:
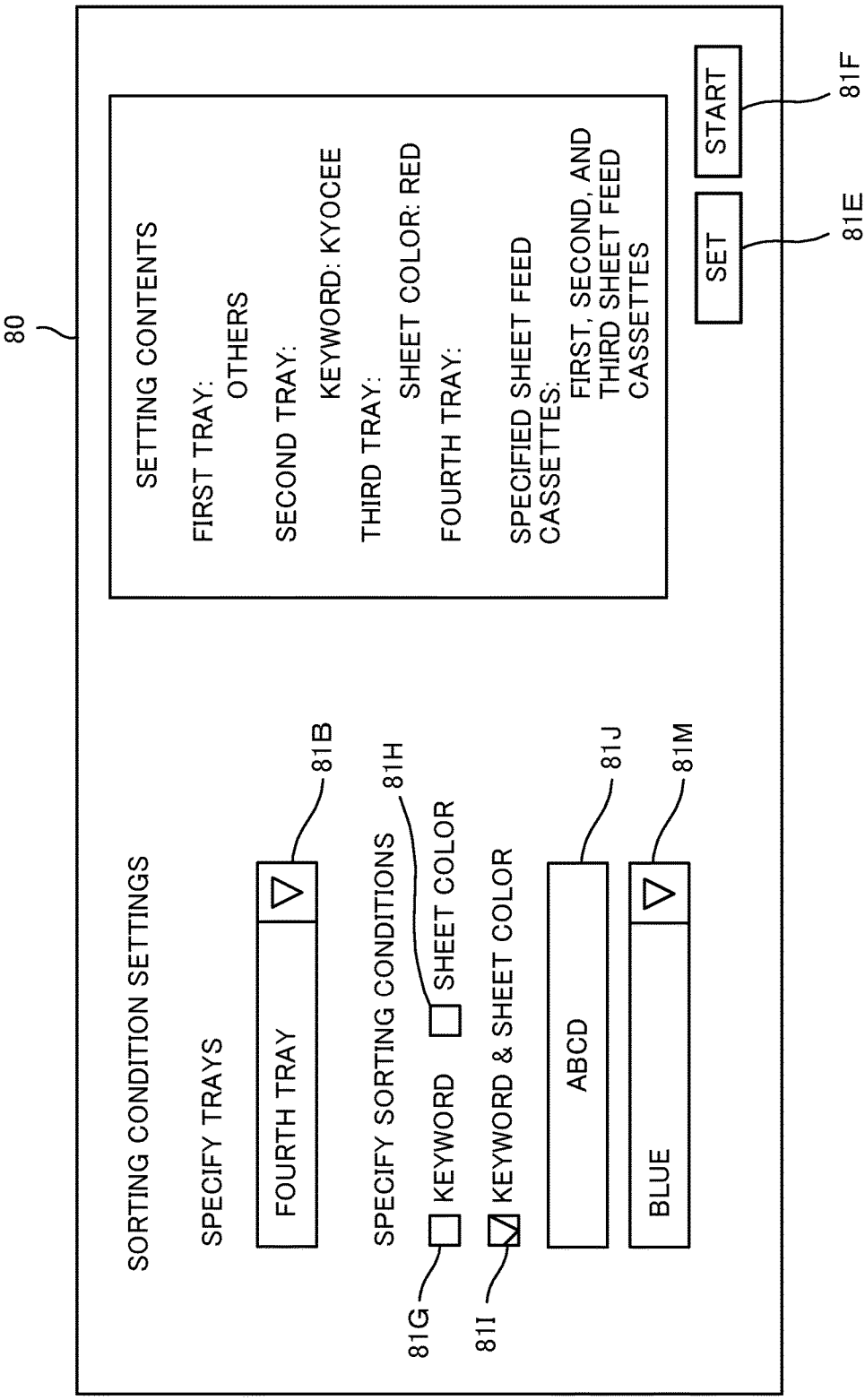
FIG. 10 is a view showing an example of still another display screen displayed on the display section of the image forming apparatus.

Then, as shown in FIG. 10, the display control section 42 allows the display section 80 to provide a display prompting the user to specify a tray to which sheets S are to be sorted and any sorting condition. Furthermore, as shown in FIG. 10, the display control section 42 allows the display section 80 to display, as a sorting condition for the third tray 77c, the sorting condition stored for the third tray 77c in the storage section 84 in S4 described above, i.e., "SHEET COLOR: RED".

When detecting that the pull-down menu 81B has been pressed by the user and that the touch panel 81 has accepted that the fourth tray 77d has been further specified, the control section 41 determines that the fourth tray 77d has been specified as a tray to which sheets S are to be sorted. Furthermore, when detecting that in the display screen shown in FIG. 10, for example, the check box 81I has been specified, that the box specification has been accepted by the touch panel 81, that the input field 81J has been further specified, that the field specification has been accepted by the touch panel 81, that the pull-down menu 81M has also been pressed, and that the touch panel 81 has accepted that, for example, "BLUE" has been further specified as the color of sheets S (YES in S3), the control section 41 determines that a keyword will be specified as a sorting condition and the color of sheets S has been specified as a sorting condition. Then, the display control section 42 allows the display section 80 to display, as shown in FIG. 8, the alphabet keys 81K1, the numeric keys 81K2, and the Enter key 81L in order that the user can specify a keyword.

Subsequently, for example, when detecting that in the display screen in FIG. 8 alphabet keys 81K1 of "ABCD" have been input, that the input has been accepted by the touch panel 81, that the Enter key 81L has been specified, and that the key specification has been accepted by the touch panel 81, the control section 41 determines that letters "ABCD" have been input as a keyword. Then, as shown in FIG. 10, the display control section 42 allows the display section 80 to display the input letters "ABCD" in the input field 81J. In addition, the control section 41 allows the storage section 84 to store the specified sorting conditions, i.e., the fourth tray 77d serving as a tray to which sheets S are to be sorted, the letters "ABCD" serving as a keyword for the fourth tray 77d, and "BLUE" serving as the color of sheets S for the fourth tray 77d (S4).

Figure 11:
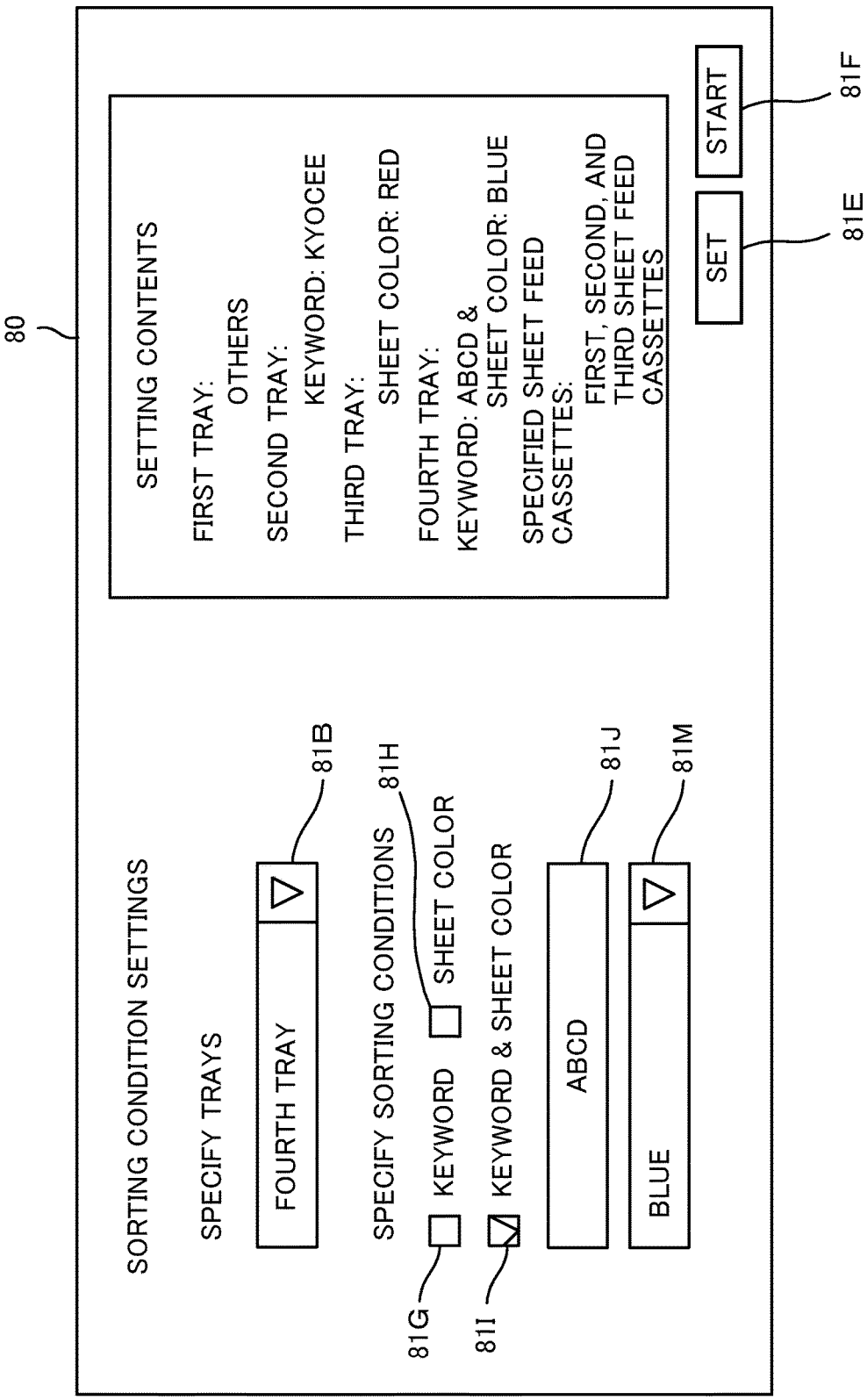
FIG. 11 is a view showing an example of still another display screen displayed on the display section of the image forming apparatus.

Then, the control section 41 determines whether the operation acceptance section has accepted a request instructing to start the execution of the sheet sorting processing from the user (S5). For example, the control section 41 detects whether the Start key 81F in the display screen shown in FIG. 10 has been specified, thus determining whether a request instructing to start the execution of the sheet sorting processing has been made. When the touch panel 81 does not detect that the Start key 81F has been specified (NO in S5), the control section 41 determines whether the specification of the sorting conditions for all the trays 77 is completed (S6). When determining that the specification of the sorting conditions for all the trays 77 is completed (YES in S6), the control section 41 does not allow the process to go back to S3 described above and allows the image forming apparatus 1 to stand by. In this regard, while the image forming apparatus 1 is on standby, the display control section 42 allows the display section 80 to display the sorting conditions specified for the first to fourth trays 77a to 77d. Specifically, as shown in FIG. 11, the display control section 42 allows the display section 80 to display, as sorting conditions for the fourth tray 77d, the sorting conditions stored for the fourth tray 77d in the storage section 84 in S4 described above, i.e., "KEYWORD: ABCD & SHEET COLOR: BLUE".

On the other hand, when detecting that the Start key 81F has been specified by the user and that the key specification has been accepted by the touch panel 81 (YES in S5), the control section 41 determines that a request instructing to start the execution of sheet sorting processing has been made. Then, the control section 41 starts the operation for sorting sheets S (S7). Specifically, the control section 41 controls the operation of the relevant pick-up roller 145 to feed to the conveyance path 190 a sheet S contained in the sheet feed cassette 141 specified as a sheet feed cassette to be firstly subjected to sorting processing. Then, the scanner 146 reads the image of the sheet S being conveyed in the conveyance path 190 and the data analyzing section 43 analyzes image data of the sheet S read by the scanner 146 and outputs the analysis result to the control section 41.

Subsequently, the control section 41 controls, using the analysis result of the data analyzing section 43, the operation of the sorting mechanism according to the sorting conditions stored in S4 described above to sort the sheet S to one of the trays 77. For example, when the sheet S is the sheet S1 shown in FIG. 4, the control section 41 determines, from the analysis result of the data analyzing section 43, that the keyword "KYOCEE" is not detected from the sheet S1 and the color of the sheet S1 is white. The control section 41 also determines, from the analysis result of the data analyzing section 43, that the keyword "ABCD" has been detected from the sheet S1 but the color of the sheet S1 is not blue. Therefore, the control section 41 sorts the sheet S1 to the first tray 77*a*. Specifically, the control section 41 controls the operation of the motor 78 to change the position of the first tray 77*a* so that the sheet S1 discharged through the exit slot 73 can be loaded on the first tray 77*a*.

For another example, when the sheet S is the sheet S2 shown in FIG. 4, the control section 41 determines, from the analysis result of the data analyzing section 43, that the keyword "KYOCEE" has been detected from the sheet S2 and the color of the sheet S2 is white. The control section 41 also determines, from the analysis result of the data analyzing section 43, that the keyword "ABCD" is not detected from the sheet S2 and the color of the sheet S2 is not blue. Therefore, the control section 41 sorts the sheet S2 to the second tray 77*b*. Specifically, the control section 41 controls the operation of the motor 78 to change the position of the second tray 77*b* so that the sheet S2 discharged through the exit slot 73 can be loaded on the second tray 77*b*.

For still another example, when the sheet S is the sheet S3 shown in FIG. 4, the control section 41 determines, from the analysis result of the data analyzing section 43, that the keyword "KYOCEE" is not detected from the sheet S3 and the color of the sheet S3 is red. The control section 41 also determines, from the analysis result of the data analyzing section 43, that the keyword "ABCD" has been detected from the sheet S3 but the color of the sheet S3 is not blue. Therefore, the control section 41 sorts the sheet S3 to the third tray 77*c*. Specifically, the control section 41 controls the operation of the motor 78 to change the position of the third tray 77*c* so that the sheet S3 discharged through the exit slot 73 can be loaded on the third tray 77*c*.

For still another example, when the sheet S is the sheet S4 shown in FIG. 4, the control section 41 determines, from the analysis result of the data analyzing section 43, that the keyword "ABCD" has been detected from the sheet S4 and the color of the sheet S4 is blue. Therefore, the control section 41 sorts the sheet S4 to the fourth tray 77*d*. Specifically, the control section 41 controls the operation of the motor 78 to change the position of the fourth tray 77*d* so that the sheet S4 discharged through the exit slot 73 can be loaded on the fourth tray 77*d*.

Then, the control section 41 determines whether the sorting processing for all the sheets S contained in the first, second, and third sheet feed cassettes 141, 142, 143 is completed (S8). For example, using detection results of respective sheet detection sensors (not shown) provided in the first, second, and third sheet feed cassettes 141, 142, 143 to detect the presence of the sheet S, the control section 41 determines whether the sorting processing for all the sheets S is completed. When determining that the sorting processing for all the sheets S is not completed (NO in S8), the control section 41 allows the process to go back to S7 described above and executes the processing again. On the other hand, when determining that the sorting processing for all the sheets S is completed (YES in S8), the control section 41 ends the sheet sorting processing.

As thus far described, in this embodiment, the scanners 146 are provided, one upstream of each of the pick-up rollers 145 in the direction of conveyance, and each read the image of a sheet S being conveyed in the conveyance path 190. The data analyzing section 43 analyzes image data of the sheet S read by the scanner 146. When the operation acceptance section has accepted a request to specify one or more predetermined sorting conditions from the user, the control section 41 allows the storage section 84 to store the predetermined sorting conditions and controls, using the analysis result of the data analyzing section 43, the operation of the sorting mechanism according to the predetermined sorting conditions stored in the storage section 84 to sort the sheet S to one of the trays 77. Thus, in this embodiment, unlike the general image forming apparatuses described in BACKGROUND above, the image forming apparatus 1 can sort to-be-sorted sheets S under the sorting conditions desired by the user.

The image forming apparatuses described in BACKGROUND cannot appropriately change the sorting conditions for to-be-sorted sheets to arbitrary conditions desired by the user and sort the sheets.

Unlike the above, in this embodiment, the image forming apparatus can sort the to-be-sorted sheets under the sorting conditions desired by the user.

Figure 12:
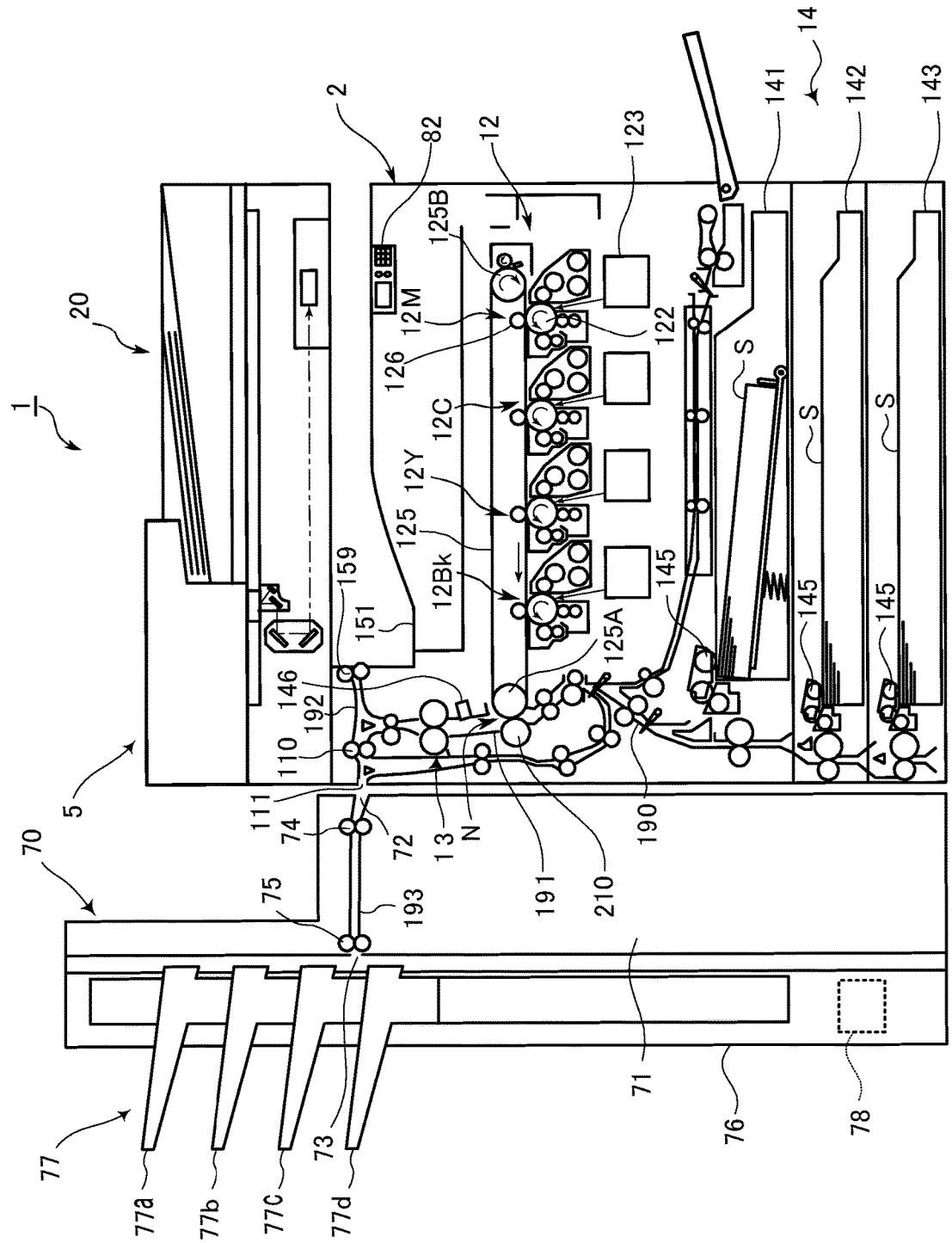
FIG. 12 is a cross-sectional view showing an image forming apparatus according to a second embodiment of the present disclosure.

Next, a detailed description will be given of an image forming apparatus according to a second embodiment of the present disclosure with reference to FIG. 12. FIG. 12 is a cross-sectional view showing the image forming apparatus according to the second embodiment of the present disclosure. Further explanation of the same structures and configurations as in the first embodiment will not be given here.

In the image forming apparatus 1 according to this embodiment, a single scanner 146 is disposed in the conveyance path 191 connecting between the secondary transfer roller 210 and the first ejection roller pair 159. Specifically, in the image forming apparatus 1 according to this embodiment, the single scanner 146 is disposed, in the above conveyance path in which a sheet can be conveyed along in the predetermined direction of conveyance from the first, second, and third sheet feed cassettes 141, 142, 143 to the exit slot 73, between the first, second, and third sheet feed cassettes 141, 142, 143 and the exit slot 73 and downstream of the plurality of pick-up rollers 145 in the direction of conveyance. Thus, in this embodiment, the number of scanners 146 disposed can be reduced as compared to the first embodiment, so that the number of parts and cost of the image forming apparatus 1 can be easily reduced. In addition, since the scanner 146 is provided downstream of the image forming section 12 in the direction of conveyance, a recording paper sheet subjected to image formation processing in the image forming section 12 can also be subjected to sorting processing using at least one of a keyword and the color of the recording paper sheet as a sorting condition.

Although the above description has been given of the case where the sheet sorting device 70 is mounted, the present disclosure is not limited to this and no limitation is placed on the sheet sorting technique except that a sorting mechanism including the support member 76 and the motor 78 is provided. For example, the mounting of the main unit 71 of the sheet sorting device 70 can be eliminated by providing the support member 76 close to the apparatus body 2 so that a sheet S discharged through the apparatus body exit slot 111 can be loaded directly on any one of the trays 77.

The structures and processing described in the above embodiments with reference to FIGS. 1 to 12 are merely illustrative of the present disclosure and the present disclosure is not intended to be limited to the above structures and processing.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   an operation acceptance section that includes a touch panel accepting an operating instruction from a user;
   a storage device;
   a plurality of sheet feed cassettes capable of containing sheets to be sorted;
   an exit slot through which the sheet is to be discharged;
   a conveyance path in which the sheet is to be conveyed along a predetermined direction of conveyance from the plurality of sheet feed cassettes to the exit slot;
   a plurality of trays where the sheet discharged through the exit slot is to be loaded;
   a sorting mechanism that sorts the sheet discharged through the exit slot to one of the plurality of trays;
   a pick-up roller that is provided, one for each of the plurality of sheet feed cassettes, and picks up the sheet from corresponding one of the plurality of sheet feed cassettes to the conveyance path;
   a scanner that scans an image of the sheet;
   a display section where the touch panel is disposed in a front thereof; and
   a control unit that has a processor,
   wherein the processor functions, in executing a sheet sorting execution program, as:
     a display control section that controls display operation of the display section;
     a data analyzing section that analyzes image data of the sheet scanned by the scanner; and
     a control section that, when the operation acceptance section accepts a specification of a predetermined sorting condition from the user, allows the storage device to store the predetermined sorting condition and allows the sorting mechanism to sort the sheet to one of the trays according to the predetermined sorting condition using an analysis result of the data analyzing section,
   the display control section allows the display section to provide, as a display prompting the user to specify the predetermined sorting condition, a display prompting at least one of: a specification of a tray, among the plurality of trays, to which the sheets are to be sorted; a specification of at least one of a predetermined keyword described on the sheets and a predetermined color of the sheets; a specification of one or more sheet feed cassettes to be subjected to the sorting; and a specification of an order of the plurality of sheet feed cassettes for sheet sorting processing,
   the control section allows the storage device to store the predetermined sorting condition when the specification of the predetermined sorting condition performed by the user at the display section according to the display prompting the user to specify the predetermined sorting condition is accepted by the operation acceptance section,
   the control section controls operation of each of the pick-up rollers to allow pickup of the sheets to the conveyance path in the order of the plurality of sheet feed cassettes having been specified and on a sheet-feed-cassette-by-sheet-feed-cassette basis,
   the data analyzing section performs OCR processing to read the keyword or detects a color of picture elements of the sheets, and
   the control section uses as the analysis result of the data analyzing section at least one of a result of the reading and a result of detection of the color of the picture elements of the sheets, and allows the sorting mechanism to sort the sheets to the specified tray to which the sheets are to be sorted according to: the specification of the tray to which the sheets are to be sorted; the specification of at least one of the keyword and the color; the specification of one or more sheet feed cassettes to be subjected to the sorting; and the specification of the order of the plurality of sheet feed cassettes for the sheet sorting processing, the just mentioned specifications being used as the predetermined sorting condition.

2. The image forming apparatus according to claim 1, wherein the single scanner is disposed, in the conveyance path, between the plurality of sheet feed cassettes and the exit slot and downstream of the plurality of pick-up rollers in the direction of conveyance.

3. The image forming apparatus according to claim 1, further comprising
   an image forming section that is located in the conveyance path between the plurality of sheet feed cassettes and the exit slot and forms an image on a recording paper sheet fed from each of the sheet feed cassettes,
   wherein the single scanner is disposed, in the conveyance path, between the plurality of sheet feed cassettes and the exit slot and downstream of the image forming section in the direction of conveyance.

4. The image forming apparatus according to claim 1, wherein
   as for the specification of the keyword included in the predetermined sorting condition, when the operation acceptance section accepts the specification of a plurality of keywords and a specification of a predetermined delimiter placed in between the keywords, the control section determines, if the delimiter is a character representing "AND", that the plurality of keywords are under an AND condition, and determines, if the delimiter is a character representing "OR", that the plurality of keywords are under an OR condition, and allows the storage device to store the sorting condition that further includes the determination of whether the plurality of keywords are under "AND" condition or "OR" condition.

* * * * *